United States Patent [19]

Ehm et al.

[11] Patent Number: 4,581,967
[45] Date of Patent: Apr. 15, 1986

[54] CUTTING APPARATUS

[75] Inventors: Karl H. Ehm, Duisburg; Roderich R. Orendi, Düsseldorf, both of Fed. Rep. of Germany

[73] Assignee: TREMAG Trennmaschinen Gesellschaft mbH, Duisburg, Fed. Rep. of Germany

[21] Appl. No.: 561,563

[22] Filed: Dec. 13, 1983

[30] Foreign Application Priority Data

Dec. 17, 1982 [DE] Fed. Rep. of Germany ....... 3246804

[51] Int. Cl.⁴ ...................... B23D 47/08; B24B 27/06
[52] U.S. Cl. ..................................... 83/452; 83/471.2; 83/490; 83/859
[58] Field of Search ................... 83/490, 471.2, 471.3, 83/477.2, 609, 564, 859, 824, 825, 452, 453, 456

[56] References Cited

U.S. PATENT DOCUMENTS

| | | | |
|---|---|---|---|
| 2,996,088 | 8/1961 | Hensley | 83/490 |
| 3,871,256 | 3/1975 | Willett | 83/490 X |
| 3,931,962 | 1/1976 | Delplanque | 83/471.3 X |
| 4,036,092 | 7/1977 | Kaltenbach | 83/471.2 |
| 4,249,443 | 2/1981 | Jagers | 83/490 |
| 4,335,637 | 6/1982 | Kaltenbach | 83/471.3 X |

FOREIGN PATENT DOCUMENTS

| | | | |
|---|---|---|---|
| 2321568 | 11/1974 | Fed. Rep. of Germany | 83/157 |
| 2454717 | 5/1976 | Fed. Rep. of Germany | 83/477.2 |

Primary Examiner—James M. Meister
Attorney, Agent, or Firm—King and Schickli

[57] ABSTRACT

A cutting apparatus has a cutting tool mounted on an e.g. pivotal support member, under the plane of cut, the cutting tool cutting upwardly through a workpiece to be cut by movement of the support member. The support member is carried by a pivot mounting on a vertical main support plate, the pivot mounting being so arranged that the plane of the cutting tool is substantially aligned with the middle of the pivot mounting. The tool feed forces are applied to the support member close to the notional plane of pivotal movement of the support member, which plane extends through the cutting tool, while the main support plate is adapted to carry clamping means on its top.

17 Claims, 10 Drawing Figures

CUTTING APPARATUS

BACKGROUND OF THE INVENTION

The present invention relates generally to a cutting apparatus such as a circular saw assembly for use on metal.

In a known form of cutting apparatus, the machine comprises a support structure or base and a cutter assembly which for example comprises a pivotal member or arm carrying a cutting tool, which thus operates from below in an upward direction. The support structure is a box-like construction which is more or less closed and which is covered at the top by a cover plate. The pivotal member is mounted in the support structure, underneath the cover plate. When the cutting tool is in the form of a circular saw, for example, the shaft of the saw is mounted on the top side of the pivotal member and the cover plate has a slot therein. The material to be sawn therefore rests on the top of the cover plate and is clamped fixedly in position by suitable clamping means. The material is then sawn by the circular saw projecting through the slot in the cover plate, as the pivotal member or arm is pivoted in an upward direction through the slot.

In other known forms of the above-indicated cutting apparatus, the mountings for the pivotal member or arm are fixed to the underside of the cover plate, whereby it is possible for the cover plate to be arranged rotatably in a horizontal plane, thereby also to permit inclined cutting operations.

However, the known cutting apparatuses suffer from a number of disadvantages, the most serious of which are as follows:

The cover plate on which the material to be sawn is also laid must be of such a size that it adequately covers over the entire support structure therebelow. As however the support structure must accommodate the entire pivotal assembly, including the motor drive for the cutter arrangement and the feed means, the cover plate must be of very large size, in relation to the size of the cutter (for example a saw blade); for reasons of rigidity and strength, the large dimensions of the cover plate in turn mean that the cover plate must be relatively thick.

As the cutter is mounted on the pivotal member which is disposed underneath the cover plate and as the cutting operation is effected in an upward direction through the slot in the cover plate as the cutter is advanced into the material to be sawn through that slot, the thickness of the cover plate means that there is a substantial reduction in the cutting region, relative to the cutting region found in cutting apparatuses which do not have a cover plate. The percentage reduction in the depth of cut of cutting apparatuses having a cover plate can be up to about 30%, in comparison with cutting apparatuses which do not have a cover plate.

Another disadvantage of the above-described constructions is that large openings must be provided in the walls of the box-like support structure, for various reasons. Such openings are required inter alia for the purpose of maintenance of the motor drive, lubricating the saw carriage or slide and the feed means, and also for replacing the saw blade, adjusting the brushes or wipers for the dust and other material produced by the cutting action or the finger-type dust-removal reamers, for adjusting the means for cooling the saw blade, and the like. All those openings weaken the support structure and give rise to a high level of expenditure, particularly when the requirements made in respect of the machining capacity of the apparatus are high, which therefore involves high requirements in regard to rigidity and strength of the cutting apparatus. Added to that is the consideration that, for safety reasons, all the openings must be properly covered over, which once again gives rise to additional cost.

Another disadvantage of the above-described forms of cutting apparatuses is that the large amount of space required for the support structure makes it very difficult for the apparatus to be integrated into an automatic production system.

Therefore, in order for cutting apparatuses of the above-described kind to have adequate dynamic or vibration strength, they involve a high degree of capital investment, with at the same time a substantial reduction in the theoretically possible cutting range. With increasing sizes of cutting apparatuses (saw blades), the expenditure required in relation to the rigidity of the machine increases as the overall strength and stability of the support structure drops rapidly as the dimensions of the support structure increase, and compensation in that respect, by means of additional ribs or by an increase in the thicknesses of the materials used, becomes more and more difficult and expensive.

On the other hand, the line of development in cutting apparatuses which are for example in the form of cold circular saws is in the direction of increasing cutting rates, with saw blades which are tipped or clad with hard metal such as a carbide being used to an increasing extent. However, that line of development requires machines which are more and more rigid and in which the amplitudes of vibration produced must be less than 0.015 mm in the feed direction. The known constructions of the general kind referred to above cannot meet those requirements, or can only meet such requirements by incurring a high level of expenditure, in which respect the capital investment required increases out of all proportion to the increasing diameter of the cutting tool.

Finally, the above-mentioned disadvantages have also had the result that the cutting apparatuses referred to above are in practice only used with cutters or saw blades of relatively small diameters, and in addition are only employed for sawing tubular or shaped or profile material.

On the other hand, the type of cutting apparatuses which have a cutter that operates in an upward direction enjoys substantial advantages, particularly in regard to sawing hollow members such as tubes. For example, such advantages are in particular that, when performing a cutting operation from the underside of the hollow member to be cut, dust and other material produced by the cutting action is drawn into the cut only to a very slight degree. Thus, when using such cutting apparatuses, the cut surfaces produced are substantially smoother than when using for example cutting apparatuses which operate in a downward direction and in which the cut surfaces are seriously damaged or marked due to dust and other material produced by the cutting action being drawn into the cut.

SUMMARY OF THE INVENTION

An object of the present invention is to provide a cutting apparatus which is an improvement over the above-discussed prior art apparatuses.

Another object of the present invention is to provide a cutting apparatus which exhibits minimum damage to the cut surface when cutting for example hollow members but which also has an extremely high output.

Still another object of the present invention is to provide a cutting apparatus such as a circular saw assembly in which the cutting region is not substantially restricted.

A further object of the present invention is to provide a metal cutting apparatus which also provides adequate access to the transmission and drive means and other components thereof and which is of a compact construction.

Yet a further object of the present invention is to provide a cutting apparatus in which the forces which occur in a cutting operation are substantially all carried by a single support component, thereby at least substantially reducing any torsional moments.

These and other objects are achieved by a cutting apparatus such as a circular saw assembly for use in cutting metal, comprising a support structure or base which mounts a cutting assembly comprising a pivotally mounted member or arm carrying the cutting tool. The cutting tool operates to cut the material to be cut, from below, in an upward direction. The support structure comprises a substantially vertically disposed main support plate which is held in position by suitable carrier or support members. The support plate has at least one pivot mounting for the pivotal member or arm, the plane of the cutting tool being substantially aligned with the middle of the said pivot mounting. The forces for feeding or advancing the cutting tool such as the circular saw blade, in operation of the apparatus, are applied to the pivotal member or arm adjacent to the imaginary plane of pivotal movement of the pivotal member or arm, which extends through the cutting tool, while the main support plate is arranged at the top for carrying suitable clamping means for clamping material to be cut.

It will be seen therefore that, with the configuration of the support structure in accordance with the principles of the present invention, the plane of the cutting tool is at least virtually or approximately coincident with the flat side of the main support plate of the support structure, whereby the path of the lines of force is closed in a very short distance. The forces which occur in a cutting operation, namely the clamping forces, the forces which occur in the mounting means of the pivotal member or arm, the feed forces and the forces exerted by the cutting tool are disposed substantially in a vertical plane and can thus be readily carried by the vertical main support plate. Any torsional moments which occur are very small, as a result of the arrangement providing only short lever arms. The main support plate which forms the main component of the support structure can be of a sufficiently rigid construction, and the carrier or support members are only provided to hold the main support plate in position. Access to the saw drive and transmission means and other components is good by virtue of the omission of the wall members which were to be found in the region of the support structure in the prior-art apparatuses in which the support structure was of a box-like configuration with a cover plate thereon. The construction in accordance with the principles of the present invention also eliminates or at least substantially reduces the above-discussed disadvantages which arose by virtue of the provision of the cover plate in the known constructions.

In accordance with the present invention, it is possible for the pivotal member or arm and the cutting tool to be arranged on the same flat side of the main support plate, or for the pivotal arm or member and the cutting tool to be arranged on opposite flat sides of the main support plate. In the latter case, the pivotal member or arm and the cutting tool are connected by way of a portion of the pivotal member or arm which extends through an opening in the main support plate.

In the situation where the main mass of the pivotal member or arm is disposed on one side of the main support plate, the pivotal member or arm has associated therewith a means for carrying the moment produced by the weight of the pivotal member or arm. The carrier means may be for example of such a design configuration that, at a position of alignment with the pivot mounting of the pivotal member or arm, the carrier means has a further pivot mounting which is arranged on a support member, for mounting a mounting trunnion carried on the pivotal member or arm.

It is also possible for the carrier means to be in the form of a hydraulic cylinder means or as a counterbalance means. In those cases, a roller guide means which bears against the main support plate, between the main support plate and an auxiliary support plate, or which engages over the main support plate on opposite sides thereof, is advantageously provided for guiding the pivotal member or arm in the plane in which it pivots.

Furthermore, in an advantageous aspect of the present invention, the main support plate, above the opening for the portion of the pivotal member or arm which extends therethrough, may have a bridge-like structure having a bridge opening which is substantially adapted to the said portion of the pivotal member or arm, the bridge structure formed in that way being of small thickness at its centre. The forces carried by the bridge structure, due to the weight of the material to be cut, are thus carried in a substantially more advantageous manner, by virtue of the substantially vertical arrangement of the main support plate, than in the case of the horizontal cover plate of the above-discussed prior art apparatuses. The thickness of the bridge structure may be very small at its centre (down to a value of zero), which results in a large cutting range in comparison with that found in the prior art apparatuses, which was reduced by the thickness of the cover plate.

Another advantageous feature of the invention provides that a second clamping means is mounted on the main support plate, thereby permitting a complete clamping arrangement to be provided on both sides of the cutting tool. That permits the material which is to be cut, to be very adequately and completely held, from both sides of the cutting tool, and that is a favourable consideration in particular when cutting leading end portions and trailing end portions (with the material to be cut being fed in the same direction).

Further objects, features and advantages of the apparatus in accordance with the principles of the present invention will be more clearly apparent from the description hereinafter of embodiments given by way of example thereof.

DESCRIPTION OF THE PREFERRED EMBODIMENTS

Figure 1:
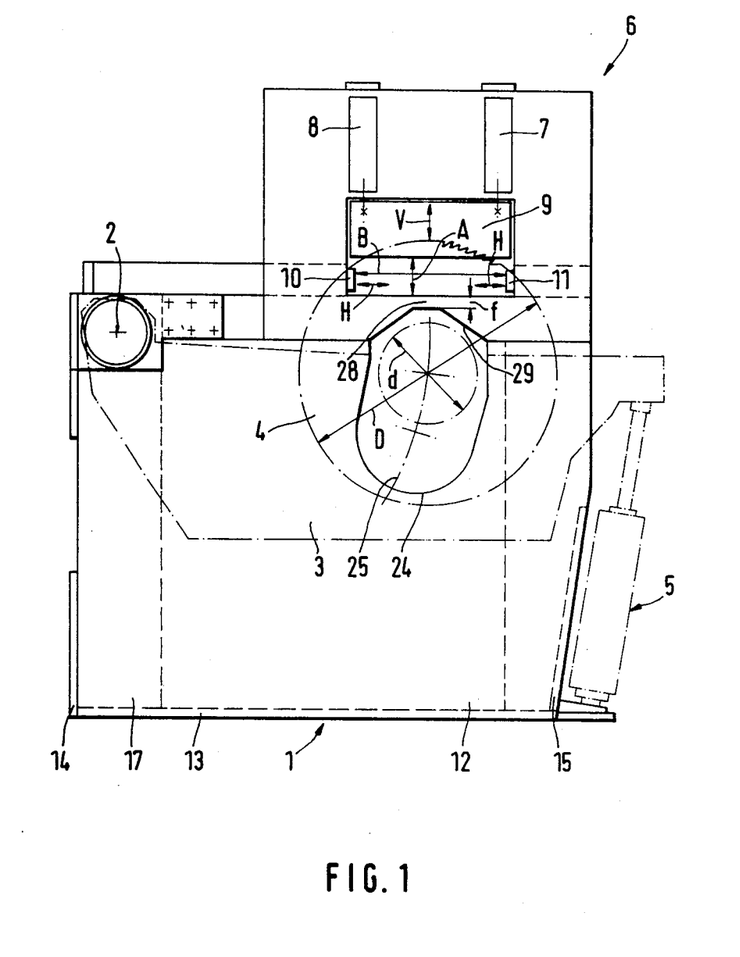
FIG. 1 shows a front view of a first embodiment of a cutting apparatus in the form of a circular saw assembly, in accordance with the present invention.

Referring firstly to FIGS. 1 through 5, shown therein is a first embodiment of a cutting apparatus in accordance with the present invention, illustrated in the form of a circular saw machine. The illustrated apparatus comprises a support or base structure 1 and a rocker arm or pivotal member 3 which is mounted pivotally on the support structure 1, about a pivot indicated diagrammatically at 2. The pivotal member 3 carries a cutting tool 4 which, in the illustrated embodiment, is in the form of a circular saw blade with an outside diameter indicated by D. Reference numeral 5 denotes a feed means, illustrated in the form of a piston-cylinder unit, for advancing the cutting tool 4 towards and through the material to be cut, in an upward direction as illustrated in FIG. 1. The apparatus also has a clamping means generally indicated by reference numeral 6, for clamping the material to be sawn, being for example in the form of tubes (not shown). The clamping means 6 comprises a vertical clamping device 9 which can be actuated by suitable actuating means 7 and 8, and horizontal clamping devices 10 and 11 which are shown in diagrammatic form. The vertical clamping device 9 is movable in the direction indicated by the arrow V while the horizontal clamping devices 10 and 11 are movable in the direction indicated by H. The maximum range of opening of the clamping devices is indicated by A (vertical direction) and B (horizontal direction).

The support structure 1 comprises a vertically disposed main support or carrier plate 12 which is supported on a bottom or base plate 13 and which is held in position by support members. In the first embodiment illustrated in FIGS. 1 through 5, the support members comprise auxiliary plates 14 and 15, an auxiliary wall portion 16, a support 17 and a projecting arm or bracing member 18. The arrangement of the support members 14 through 18 can be clearly seen from the various views shown in FIGS. 1 through 5. The individual components constituting the support assembly 14 through 18 are suitably joined together, with the main support plate 12. The support members are all carried on that flat side of the main support plate 12 which is opposite to the saw blade 4, as can be clearly seen for example from FIGS. 2 and 3. As can be seen more particularly from FIG. 3, the pivotal member or arm is also disposed on the flat side of the main support plate 12, which is opposite to the saw blade 4. The pivotal member or arm 3 comprises a portion 3b providing mounting trunnion members 19 and 20 at respective ends thereof. The mounting trunnion member 19 is mounted in a pivot mounting or bearing 21 of the main support plate 12, or a trunnion mounting housing 22 which is connected to the main support plate 12, while the mounting trunnion member 20 is mounted in a pivot mounting 23 which is supported by the support member 17 and which is suitably aligned with the pivot mounting 21. The moment generated by the weight of the pivotal member 3 which is thus disposed at the side of the main support plate 12 opposite to the saw blade 4 and which is mounted in the pivot mounting 21 on the main support plate 12 is thus carried by the pivot mounting 23 carried by the support member 17. Thus, the pivot mounting 23 carries the weight moment G exerted in a downward direction at a spacing Q (shown for example in FIGS. 2 and 5) from the plane of the saw blade 4, at the centre of gravity of the pivotal member or arm 3, which is indicated by S in FIGS. 2 and 5. Further details of the pivotal member or arm 3, including inter alia for example a drive means and a transmission arrangement, are not shown in the drawings.

Figure 2:
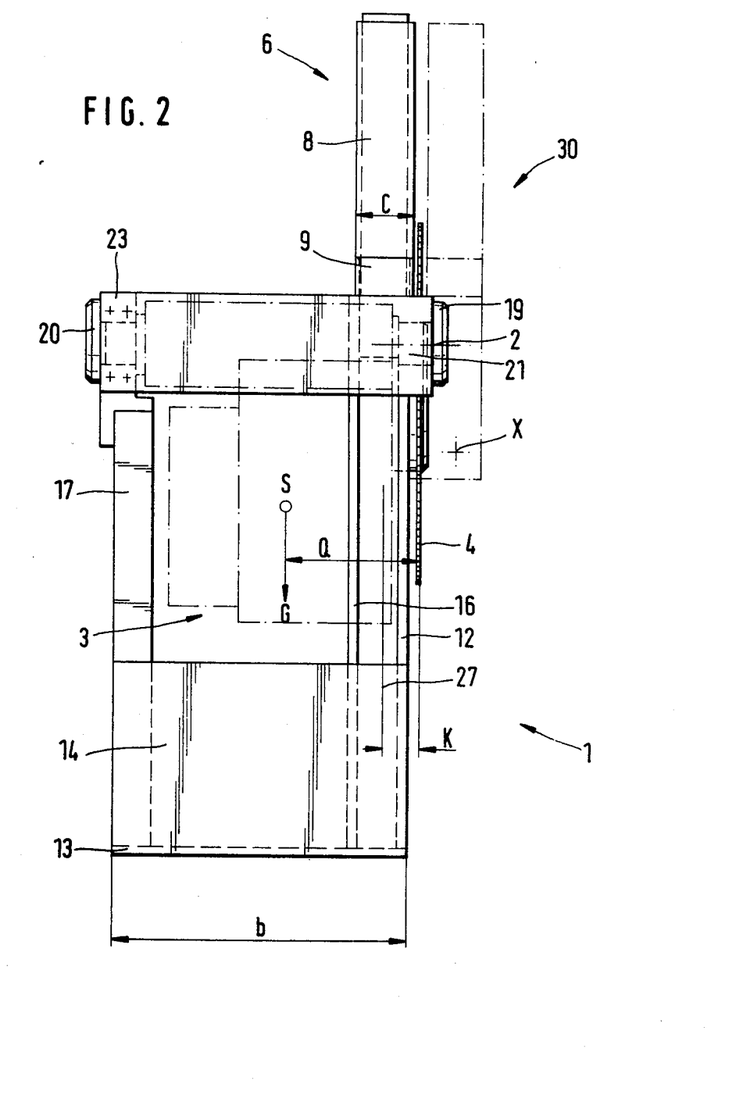
FIG. 2 shows a side view of the apparatus shown in FIG. 1, as viewed from the left-hand side thereof.

The cutting tool assembly 4 is connected to the pivotal arm or member 3 which is disposed on the opposite flat side of the main support plate 12, by way of a portion 3a of the pivotal arm, which extends through an opening 24 in the main support plate 12. As shown in FIGS. 1 and 4, the opening 24 is of such a configuration that the portion 3a carrying the cutting tool can follow the feed movement of the pivotal member or arm 3, which is shown in dash-dotted lines in FIGS. 1 and 4, being denoted by reference numeral 25. The plane of the saw blade 4 is aligned with the middle, indicated by reference numeral 26 in FIG. 3, of the pivot mounting 21, with the result that no torsional moment occur in that respect. The fixing flange diameter of the saw blade 4 is denoted by d in for example FIGS. 1 and 4. In the illustrated embodiment, as shown in FIG. 2, the feed means 5 in the form of the piston-cylinder unit engages the pivotal member or arm 3 at the position indicated by reference numeral 27, and is thus displaced with respect to the plane of the saw blade 4, by the distance K. It will be seen that the lever arm constituted by the distance K is relatively short so that the feed forces for advancing the cutting tool are applied to the pivotal member or arm, close to the imaginary plane of pivotal movement of the pivotal member or arm 3, such plane extending through the saw blade 4. It will be appreciated that it would be readily possible for the point on the pivotal member or arm 3 at which the feed forces are applied thereto to be displaced in such a way that the distance K is zero. However, in the embodiment illustrated in FIGS. 1 through 5, it is assumed that a small residual moment about the lever arm defined by the distance K does not have a large influence from the point of view of producing a secure line of cut, as the moment which is produced by the weight G of the pivotal member or arm 3 about the lever arm indicated at Q predominates.

The forces which are produced in a cutting operation, namely, the feed force, the cutting force produced by the cutting tool and the mounting forces applied to the pivot mounting 21 all lie substantially in a vertical plane and are carried by the main support plate 12. The main support plate 12, which is arranged at its top for mounting the clamping means 6, is of a bridge-like configuration over the opening 24 for the portion 3a of the pivotal member or arm which extends through the main support plate 12. The bridge configuration is indicated at 28 in FIG. 4 and is of small thickness at its centre, as indicated by f. The opening 29 defined by the bridge configuration 28, as shown in FIGS. 1 and 4, is adapted in its configuration to the shape of the portion 3a of the rocker member or arm. It will be seen that the maximum height of cut that can be achieved, when using a cutting movement in an upward direction, is delimited by the dimension f of the bridge 28. In the apparatus constructed in accordance with the principles of this invention, the dimension f can be very small. In principle, it is even possible for the bridge structure to be formed from two parts which are only in punctiform contact with each other at the centre so that the dimension f, and therewith the reduction in height of cut of the cutting tool, which is caused by the presence of the bridge structure, theoretically approaches or even reaches the value zero.

It should also be noted that the material clamping forces are applied to the vertical main support plate 12, in a vertical direction.

Figure 5:
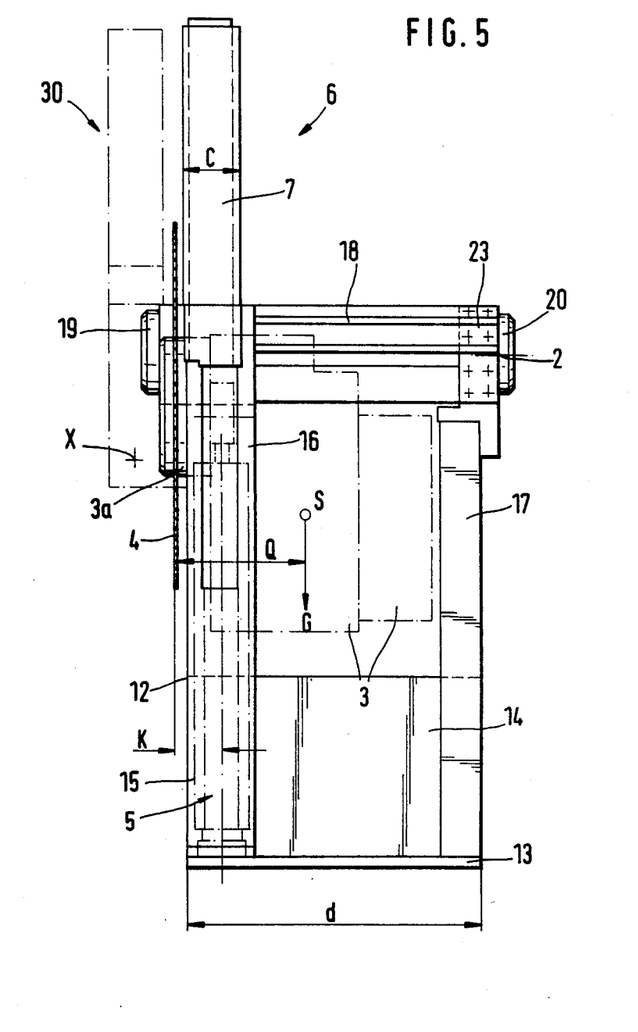
FIG. 5 shows a side view of the apparatus shown in FIG. 1, as viewed from the right-hand side therein.
Figure 6:
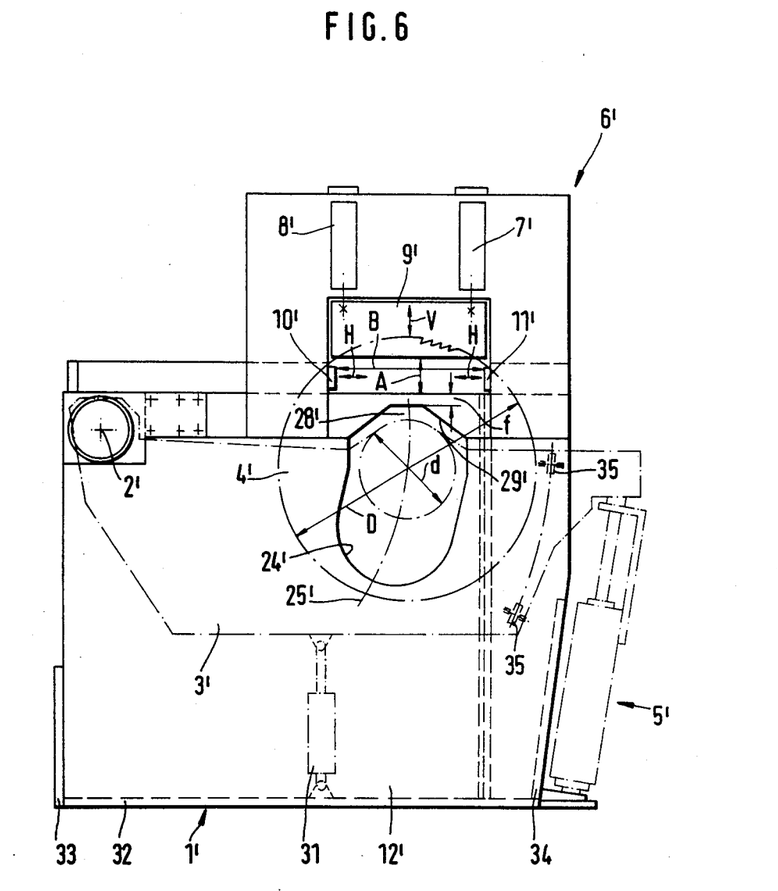
FIG. 6 shows a front view of a second embodiment of a cutting apparatus in the form of a circular saw assembly, according to the invention.
Figure 7:
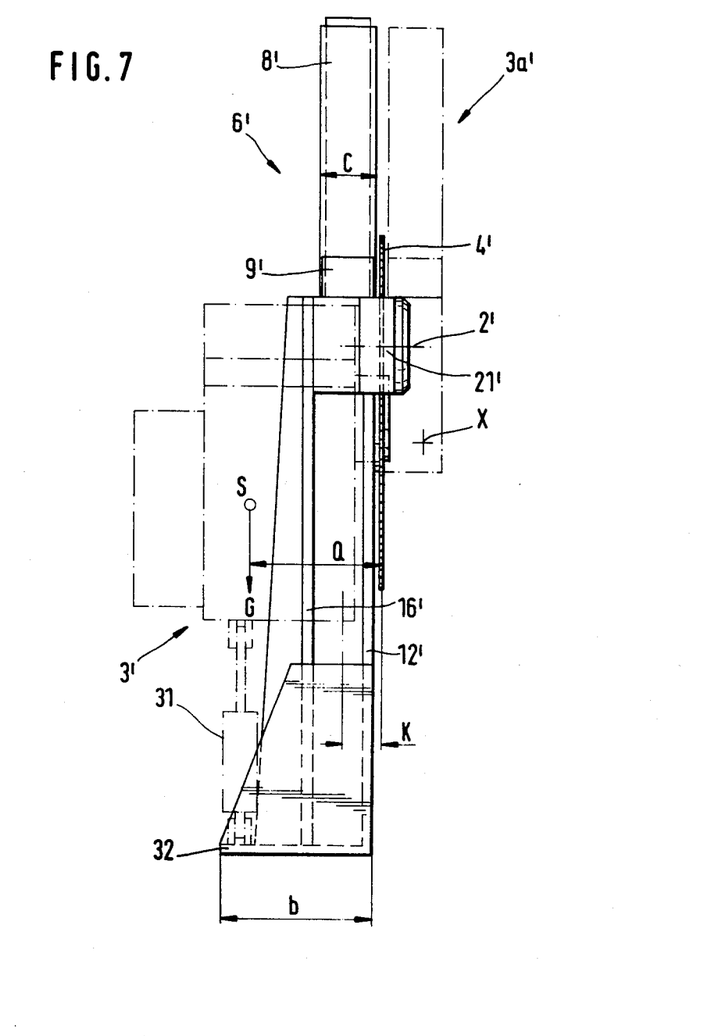
FIG. 7 shows a side view of the apparatus shown in FIG. 6, viewed from the left-hand side therein.
Figure 8:
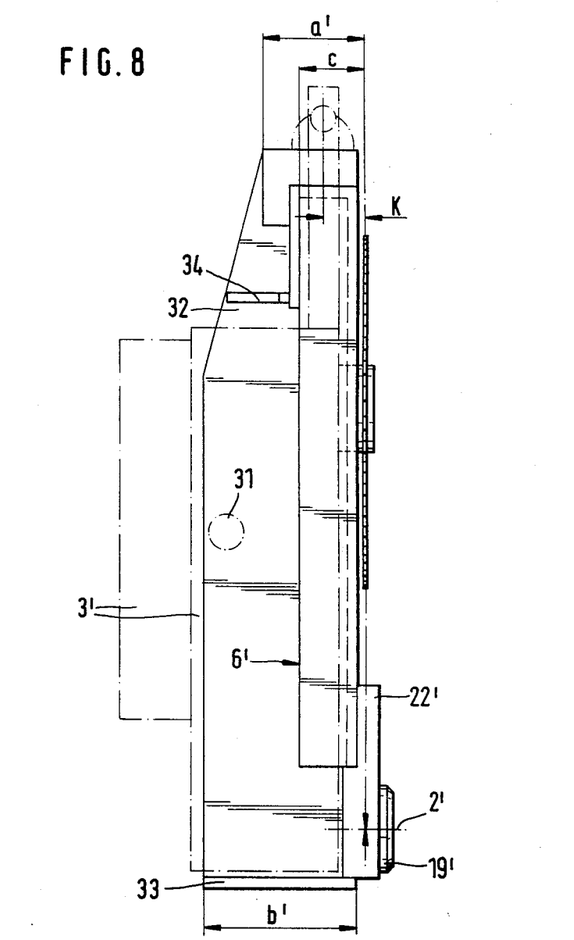
FIG. 8 shows a plan view of the apparatus shown in FIG. 6.
Figure 9:
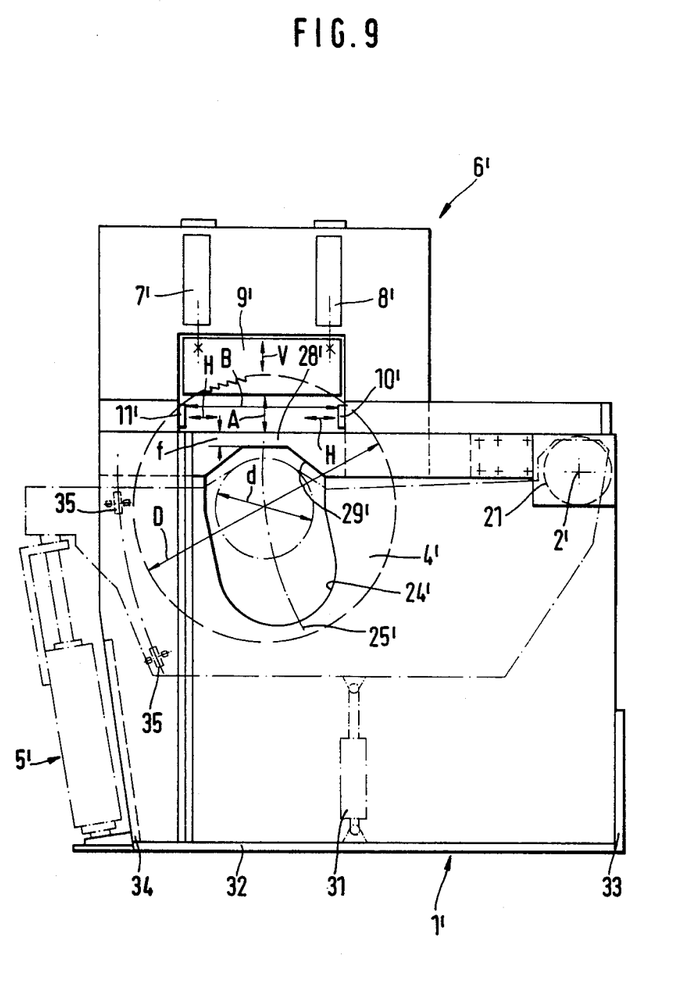
FIG. 9 shows a rear view of the apparatus shown in FIG. 6.
Figure 10:
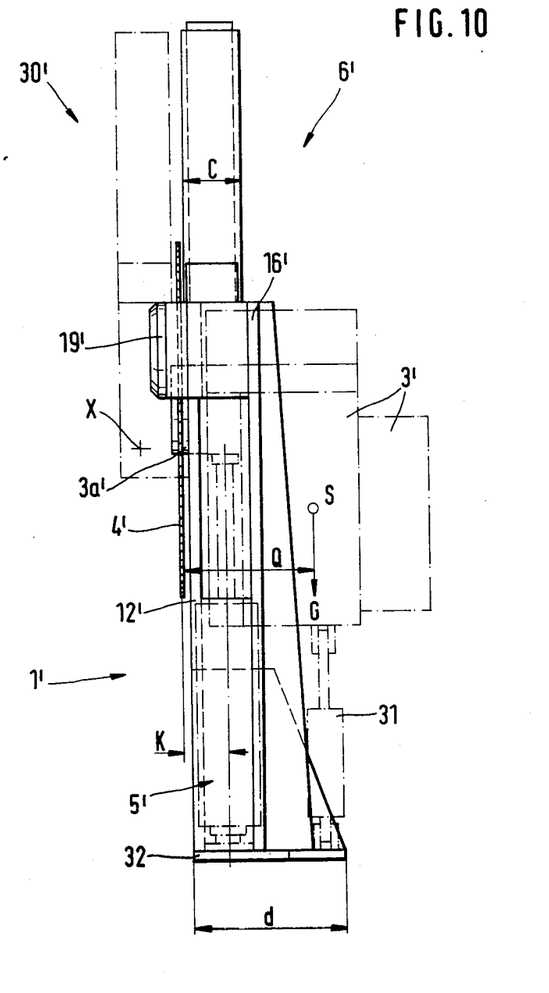
FIG. 10 shows a side view of the apparatus shown in FIG. 6, as viewed from the right-hand side.

As indicated in broken lines in FIGS. 2 and 5, a second clamping means indicated by reference numeral 30 may be disposed on the main support plate 12, on the side of the saw blade 4 which is remote from the clamping device 6. The second clamping device 30 can be rigidly connected to the main support plate 12, or it can also be arranged for pivotal movement about the axis indicated by X. It will be readily appreciated that all clamping forces are closed to themselves over a short distance in the region of the second clamping device 30, while the forces which are produced by the cutting operation are applied to the main support plate 12 by way of a very short lever arm, and only a very small amount of torsion is produced.

Figure 3:
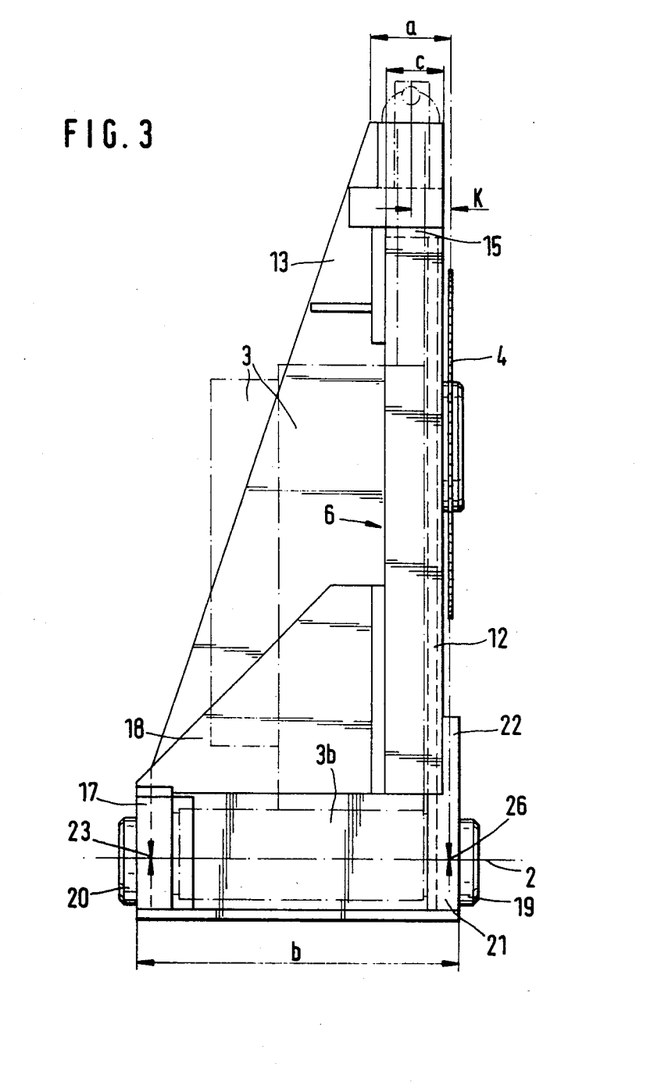
FIG. 3 shows a plan view of the apparatus shown in FIG. 1.
Figure 4:
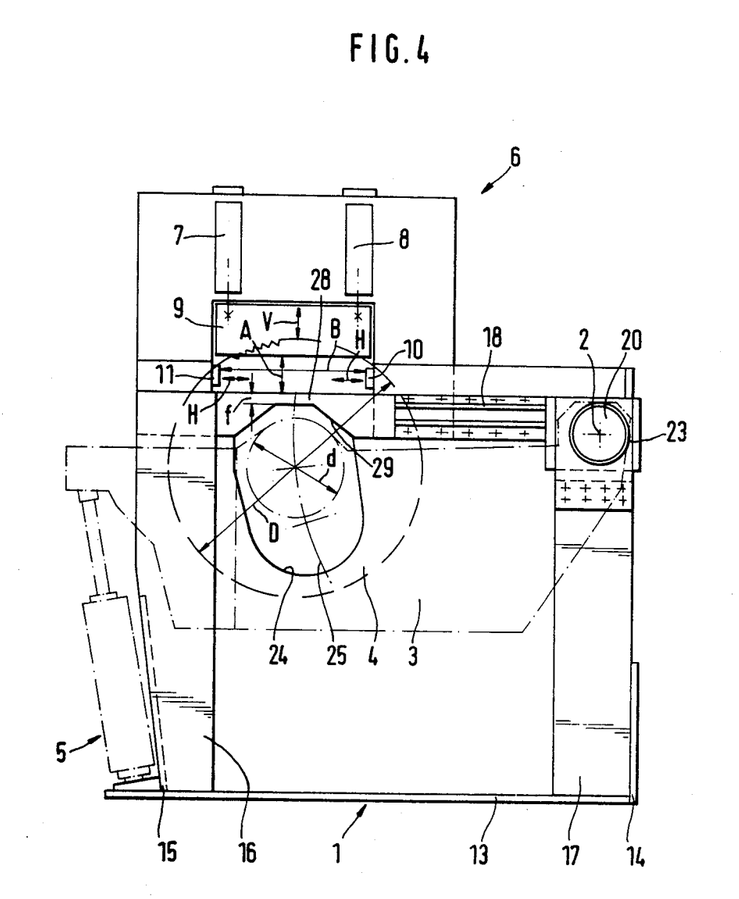
FIG. 4 shows a rear view of the apparatus shown in FIG. 1.

Reference may now be made in particular to FIG. 3, to show that, by virtue of the design configuration of the apparatus in accordance with the invention, the cutting apparatus takes up only a small amount of space. The dimensions a of the base plate 13 at one end thereof are substantially smaller than the dimensions b at the other end. Merely for the sake of completeness, it should be mentioned herein that side plates (not shown specifically) of the clamping device 9 are of a width indicated by c in FIGS. 3 and 5.

It should also be noted here that, while the pivotal member or arm 3 and the cutting tool are arranged on opposite flat sides of the main support plate 12 in the embodiment illustrated in FIGS. 1 through 5, it would obviously alternatively be possible for the pivotal member or arm 3 and the cutting tool 4 to be disposed on the same flat side of the main support plate 12.

Reference will now be made to FIGS. 6 through 10 showing a second embodiment of the apparatus in accordance with the present invention, which differs from the embodiment described above with reference to FIGS. 1 through 5, essentially only by virtue of a different form of means for carrying the moment generated by the weight of the pivotal member or arm 3.

While, in the embodiment described with reference to FIGS. 1 through 5, the pivotal member or arm 3 therein is mounted in two pivot mountings 21 and 23, the construction shown in FIGS. 6 through 10 provides that the pivotal member or arm 3' is only mounted in the pivot mounting carried by the main carrier plate 12', and the means for carrying the moment produced by the weight of the pivotal member or arm 3' is in the form of a hydraulic cylinder means, to which more detailed reference will be made below.

In addition, for the purposes of guiding the pivotal member or arm 3' in its plane of pivotal movement, the apparatus illustrated in FIGS. 6 through 10 has a roller guide means disposed operatively between the main support plate 12' and an auxiliary support plate, which once again will be described in greater detail below. As the two embodiments illustrated are the same in many of their major details, the components which are identical or at least substantially similar will not be described again in relation to FIGS. 6 through 10. Accordingly, components which substantially correspond to the components shown in FIGS. 1 through 5 are illustrated in FIGS. 6 through 10 by the same references, with the appendage of a prime (').

Referring therefore to FIGS. 6 through 10, the means for carrying the weight moment of the pivotal member or arm 3' is in the form of a hydraulic piston cylinder unit 31 which engages the pivotal member or arm 3' at a position at least substantially underneath the centre of gravity thereof, the other end of the hydraulic piston cylinder unit 31 being connected to and supported on the base plate of the apparatus, which is indicated by reference numeral 32 in this embodiment. The dimensions of the base plate 32 at its ends, as indicated by a' and b', show that this construction permits the cutting apparatus to be even narrower. Correspondingly, the auxiliary plates referenced 33 and 34 in this embodiment, to serve as support members for the main support plate 12', are smaller than in the embodiment described with reference to FIGS. 1 through 5.

The apparatus shown in FIGS. 6 through 10 also has a roller guide means, as mentioned above, which is indicated by reference numeral 35. The purpose of the roller guide means 35 is to guide the pivotal member or arm 3' in its plane of pivotal movement. As can be best seen from FIGS. 6 and 9, the roller guide means 35, which comprises a plurality of suitably mounted guide rollers, is disposed between the main support plate 12' and an auxiliary guide plate 16' (see for example FIG. 7) which is disposed at a spacing from, substantially parallel to, the main support plate 12'. The guide rollers 35 thus bear against the plates 12' and 16'. In an alternative form of the guide means, guide rollers may be disposed on opposite sides of and bear against the main support plate.

Various modifications and alterations may be made in the above-described constructions without thereby departing from the spirit and scope of the present invention. For example, the arrangement may be such that the cutter assembly including the cutting tool is not disposed on a pivotal arm or member and, while operating in an upward direction, the weight of the cutting assembly is compensated for example by means of a piston-cylinder unit. 9n

What is claimed is:

1. A cutting apparatus comprising: a support structure including an at least substantially vertically disposed main support plate and means for supporting said main support plate in its at least substantially vertical position; at least one mounting means on said main support plate; a carrier member mounted on said main support plate movably with respect thereto by said at least one mounting means; said main support plate having an opening therethrough and wherein said carrier member has a portion extending through said opening, a cutting means including a cutting tool being carried on said portion of said carrier member whereby said carrier member and said cutting tool are disposed on mutually opposite sides of said main support plate, said cutting means being adapted to operate from below material to be cut in an upward direction, the plane of the cutting tool being at least substantially aligned with the middle of the carrier member mounting means on said main support plate; means for moving said carrier member to cause said cutting tool to be fed into said material to be cut thereby, the force of said feed means being applied to the carrier member in a plane at least substantially adjacent to the plane that extends through said cutting tool; and means on an upper portion of said main support plate, for mounting clamping means.

2. Apparatus as set forth in claim 1 wherein said mounting means comprises a pivot mounting and said carrier member is mounted pivotally by said pivot mounting.

3. Apparatus as set forth in claim 1 wherein said carrier member and said cutting tool are disposed on a same flat side of said main support plate.

4. Apparatus as set forth in claim 1 including a means for carrying a moment of the weight of said carrier member.

5. Apparatus as set forth in claim 2 including a means for carrying a moment of the weight of said carrier member.

6. Apparatus as set forth in claim 2 including a means for carrying the moment of the weight of the pivotal carrier member operatively associated therewith, said carrying means comprising a further pivot mounting disposed in alignment with the first-mentioned pivot mounting and said carrier member comprising a mounting trunnion portion engaged in said further pivot mounting for supporting the carrier member thereby.

7. Apparatus as set forth in claim 4 wherein said carrying means comprises a fluid pressure-operated cylinder means.

8. Apparatus as set forth in claim 5 wherein said carrying means comprises a fluid pressure-operated cylinder means.

9. Apparatus as set forth in claim 4 wherein said carrying means comprises a counterbalance means.

10. Apparatus as set forth in claim 5 wherein said carrying means comprises a counterbalance means.

11. Apparatus as set forth in claim 1 and further including a roller guide means operable to guide said carrier member in the plane of operating movement thereof.

12. Apparatus as set forth in claim 11 and further including an auxiliary guide plate disposed adjacent to said main support plate wherein said roller guide means is operatively disposed between said main support plate and said auxiliary guide plate and is co-operable therewith to guide said carrier member in the plane of operating movement thereof.

13. Apparatus as set forth in claim 11 wherein said roller guide means is adapted to engage mutually oppositely disposed sides of said main support plate.

14. Apparatus as set forth in claim 1 and further including a second clamping means on said main support plate.

15. Apparatus as set forth in claim 1 wherein said cutting means comprises a circular saw assembly.

16. A cutting apparatus comprising: a support structure including a base means and a main support plate disposed at least substantially vertically on said base means, said main support plate having an opening therethrough; a pivot mounting means on said main support plate at a vertical spacing from said base means; a carrier member having a first end and a second end, said first end being connected to said pivot mounting means, whereby said carrier member is pivotal relative to said main support plate, said carrier member intermediate its ends having a carrier portion extending movably through said opening in said main support plate; actuating means operatively connected between said base means and said second end of said carrier member for producing pivotal feed movement thereof in an at least substantially vertical direction; a cutting assembly adapted to carry a cutting tool, being carried on said carrier portion whereby said carrier member and said cutting tool are disposed on respective mutually opposite sides of said main support plate, said cutting assembly being displaceable by said carrier member in an at least substantially vertical direction thereby to cut material in an upward direction, the plane of cut of said cutting tool being substantially aligned with the center of said pivot mounting means on said main support plate and the forces applied to said carrier member by said actuating means to produce pivotal feed movement thereof with said cutting assembly, being applied to said carrier member at least substantially adjacent to the plane that extends through said cutting tool; and means on said main support plate for clamping said material to be cut.

17. A cutting apparatus comprising: a support structure including an at least substantially vertically disposed main support plate and means for supporting said main support plate in its at least substantially vertical position; at least one mounting means on said main support plate; a carrier member mounted on said main support plate movably with respect thereto by said at least one mounting means; said main support plate having an opening therethrough and wherein said carrier member has a portion extending through said opening and adapted to carry a cutting means including a cutting tool adapted to operate from below material to be cut in an upward direction, the main support plate above said opening being of a bridge-like configuration defining a bridge opening which is substantially adapted to said portion of said carrier member extending therethrough, the bridge configuration being of small thickness substantially at its centre; the plane of the cutting tool being at least substantially aligned with the middle of the carrier member mounting means on said main support plate; means for moving said carrier member to cause said cutting tool to be fed into said material to be cut thereby, the force of said feed means being applied to the carrier member in a plane at least substantially adjacent to the plane that extends through said cutting tool; and means on an upper portion of said main support plate, for mounting clamping means.

* * * * *